US007783381B2

(12) United States Patent
Walker et al.

(10) Patent No.: US 7,783,381 B2
(45) Date of Patent: Aug. 24, 2010

(54) PRODUCTS AND PROCESSES FOR COMMUNICATING INFORMATION REGARDING A PRODUCT DISPENSED BY A VENDING MACHINE

(75) Inventors: Jay S. Walker, Ridgefield, CT (US); Paul T. Breitenbach, Wilton, CT (US); Daniel E. Tedesco, Huntington, CT (US); Matthew D. Breitenbach, Ridgefield, CT (US); Robert C. Tedesco, Fairfield, CT (US); Paul D. Signorelli, Ridgefield, CT (US); Stephen C. Tulley, Monroe, CT (US); Geoffrey M. Gelman, Brooklyn, NY (US)

(73) Assignee: Walker Digital, LLC, Stamford, CT (US)

( * ) Notice: Subject to any disclaimer, the term of this patent is extended or adjusted under 35 U.S.C. 154(b) by 645 days.

(21) Appl. No.: 11/719,441

(22) PCT Filed: Jul. 12, 2005

(86) PCT No.: PCT/US2005/024653

§ 371 (c)(1),
(2), (4) Date: Jun. 18, 2007

(87) PCT Pub. No.: WO2006/017268

PCT Pub. Date: Feb. 16, 2006

(65) Prior Publication Data

US 2009/0157220 A1 Jun. 18, 2009

Related U.S. Application Data

(60) Provisional application No. 60/587,179, filed on Jul. 12, 2004.

(51) Int. Cl.
*G06F 17/00* (2006.01)

(52) U.S. Cl. ....................... 700/240; 700/236; 700/237; 700/241; 700/244

(58) Field of Classification Search ................. 700/236, 700/237, 240, 241, 244
See application file for complete search history.

(56) References Cited

U.S. PATENT DOCUMENTS

| | | | | |
|---|---|---|---|---|
| 4,512,453 | A * | 4/1985 | Schuller et al. | 700/237 |
| 5,091,713 | A * | 2/1992 | Horne et al. | 700/236 |
| 6,658,323 | B2 * | 12/2003 | Tedesco et al. | 700/236 |
| 7,490,054 | B2 * | 2/2009 | Reade et al. | 705/16 |

OTHER PUBLICATIONS

International Search Report for Application No. PCT/US05/24653, dated Feb. 7, 2006, 1 pg.
Written Opinion for Application No. PCT/US05/24653, dated Feb. 7, 2006, 3pp.

* cited by examiner

*Primary Examiner*—Gene Crawford
*Assistant Examiner*—Timothy R Waggoner
(74) *Attorney, Agent, or Firm*—Fincham Downs LLC

(57) ABSTRACT

According to an embodiment, information about a product is communicated to at least one customer of a vending machine. It is determined whether to dispense a product from the vending machine, and the product is dispensed from the vending machine.

6 Claims, 8 Drawing Sheets

120

| PRODUCT IDENTIFIER | PRODUCT DESCRIPTION | PRODUCT CATEGORY | PRODUCT INFORMATION | ROW POSITION IDENTIFIER | RETAIL PRICE | |
|---|---|---|---|---|---|---|
| P-123456789 | SNICKERS | CANDY | CALORIES= 230<br>FAT= 7 GRAMS<br>CARBS = 8 GRAMS<br>CONTAINS PEANUTS | A1 | $0.75 | |
| P-234567891 | MILKY WAY | CANDY | CALORIES = 220<br>FAT = 5 GRAMS<br>CARBS = 9 GRAMS | A2 | $0.50 | |
| P-345678912 | MARLBORO MILD | TOBACCO | SURGEON GENERAL WARNING: SMOKING CAUSES CANCER | A3 | $3.50 | |

FIG. 4A 120 (CONT.)

| MINIMUM SELLING PRICE | COST | ACTUAL (CURRENT) PRODUCT VELOCITY | IDEAL PRODUCT VELOCITY | CURRENT NUMBER IN STOCK |
|---|---|---|---|---|
| $0.40 | $0.20 | 0.5 / DAY | 3.0 / DAY | 5 |
| $0.40 | $0.20 | 0 / DAY | 3.0 / DAY | 4 |
| $1.50 | $.90 | 0.5 / DAY | 4.0 / DAY | 3 |

FIG. 4B

PRODUCTS AND PROCESSES FOR COMMUNICATING INFORMATION REGARDING A PRODUCT DISPENSED BY A VENDING MACHINE

The present application claims the benefit of:

(I) International Application No. PCT/US2005/024653, filed Jul. 12, 2005 in the name of Walker Digital, LLC et al. entitled, PRODUCTS AND PROCESSES FOR COMMUNICATING INFORMATION REGARDING A PRODUCT DISPENSED BY A VENDING MACHINE; and (ii) U.S. Provisional Application No. 60/587,179, filed Jul. 12, 2004 in the name of Walker et al. entitled, APPARATUS, SYSTEM AND METHODS FOR COMMUNICATING INFORMATION REGARDING VENDING MACHINE INVENTORY.

The content of each of these applications is incorporated herein by reference.

BRIEF DESCRIPTION OF THE DRAWINGS

FIGS. 4A and B are a table illustrating an example data structure of an example product inventory database.

DETAILED DESCRIPTION

Terms

Figure 1:
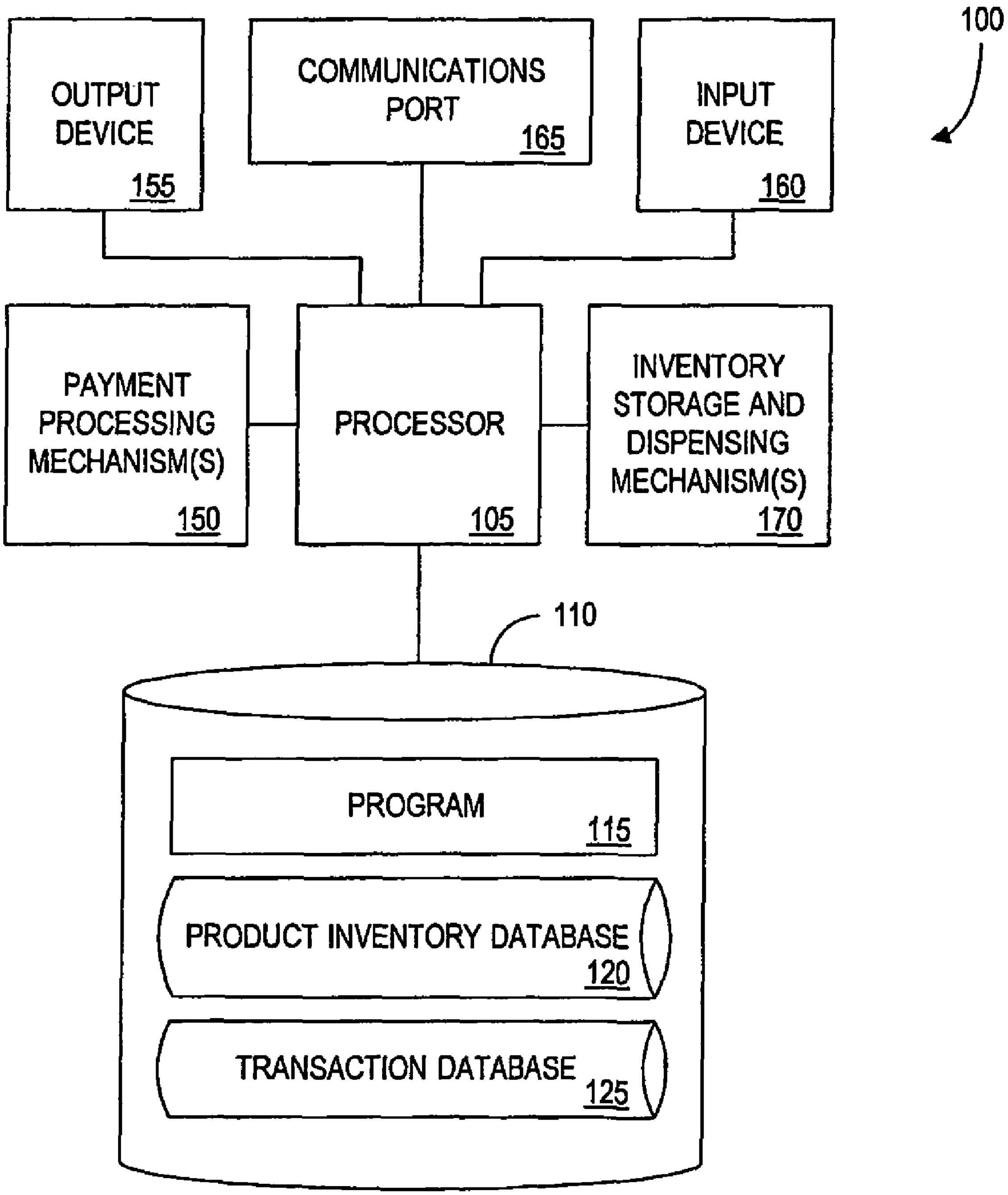
FIG. 1 is a block diagram of an embodiment of a vending machine.

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) embodiments of the disclosed invention(s)", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples are not Limiting

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s).

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

Determination

"Determining" something can be performed in a variety of manners and therefore the term "determining" (and like terms) includes calculating, computing, deriving, looking up (e.g., in a table, database or data structure), ascertaining and the like.

Computing

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

Various embodiments disclosed herein permit information regarding vending machine inventory to be communicated.

For example, in an embodiment a vending machine communicates information regarding a product to at least one customer of the vending machine. The vending machine determines whether to dispense a product, and the product is dispensed from the vending machine. The vending machine may, in an embodiment, determine whether to dispense the product based on whether the customer acknowledges the information (e.g., by pressing keypad buttons or touch screen icons in a certain order, by answering test questions correctly).

In an embodiment, information concerning the nutritional content of vending machine inventory is communicated to one or more customers of a vending machine. In some embodiments, a customer may or may not proceed to transact with a vending machine (e.g. by purchasing one or more items) based on the information and/or the customer's response thereto.

For example, in an embodiment, information concerning nutritional content is presented upon the request of a customer. The requested information may comprise nutritional information about all of the inventoried items, or a subset thereof. Thus, in an embodiment, a customer may indicate, to a vending machine, a desire to learn which of the inventoried items hold certain nutritional attributes (e.g. which items are comprised of certain ingredients, which are Atkins® approved, kosher, low fat, low carbohydrate, low calorie, low sugar, contain peanuts, etc.). In response, the vending machine and/or a computer associated therewith (e.g. a controller) may instruct an output device of a vending machine (e.g. a machine-mounted LCD screen) and/or an output device of a user device (e.g. an LCD screen of a customer's cellular telephone) to output an indication of which items hold the relevant nutritional attributes. For example, a customer may request to see which of the inventoried items are "fat free", and the vending machine may flash LED lights mounted proximately to the inventoried products which do not contain fat. Accordingly, the customer may easily determine, and select for purchase, one or more items which are fat free.

Further, in an embodiment, a vending machine may be configured to require the customer's acknowledgement of certain nutritional information before the customer is permitted to purchase one or more inventoried products. For example, prior to dispensing a product, a vending machine may output, via an LCD screen, one or more product-related warnings (i.e. a "confirmation" or "consent" screen). The customer may be required to indicate (e.g. by touching a graphical icon depicted on an LCD touch screen) his or her acceptance of the risks associated with purchasing the product. Thus, a vending machine may restrict access to products unless customers acknowledge the risks associated with such products (e.g. customers may not purchase cigarettes unless they expressly acknowledge the risks associated with smoking; customers may not purchase PayDay® candy bars unless they expressly acknowledge that the product includes peanuts).

Many further embodiments are contemplated, as discussed herein.

DEFINITIONS

Actual product velocity—The actual rate at which a given product is sold by a vending machine during a period of time (e.g., during a sales period).

Fill Period, Sales Period—The period of time between restock dates.

Full Price, Retail Price—In some embodiments, the normal price charged for the purchase of one unit of a given product.

Ideal product velocity, Target product velocity, Target velocity—The desired rate at which a given product should be sold by a vending machine during a period of time (e.g., during a sales period). Thus, in some embodiments, an ideal velocity may be set or calculated for each product indicating the rate at which products must be sold in order to deplete the inventory to a certain level by the end of a given sales period (i.e., by the next restocking event at the vending machine).

For example, an ideal product velocity may be calculated by a vending machine control system after an operator inputs a restock date and a desired remaining inventory for the date. For example, an operator may wish to have only one of each product remaining at the next restocking event so that the vending machine sells as many products as possible without completely selling out and thereby disappointing customers. Thus, in the preceding example, if an operator (a) stocks 50 units of Soda A, (b) inputs a restock date fourteen days away, and (c) indicates that only one unit of Soda A should remain at the restock date, the control system may divide 49 by 14 to conclude that, on average, 3.5 units must be sold per day within the sales period in order to realize the ideal product velocity.

Operator—The owner (or agent thereof) of a vending machine. In an embodiment, an operator is a "route driver" or other service person that services one or more vending machines by restocking vending machines, and/or removing or depositing currency in vending machines.

Product, Item—A good or service sold by a vending machine. Examples of goods sold at vending machines include beverages (e.g. cans of soda; bottles of water or iced tea), snacks (e.g. candy bars; bags of chips), tobacco products and toys. Examples of services sold by vending machines include car washes, photography services and access to digital content (e.g. permitting the downloading of MP3 files or cellular telephone "ring tones" to a handheld device such as an iPod™ or cellular telephone).

Product Information, Product Information Attribute, Information(al) Attribute, Nutritional Data, Nutrition(al) Information, Health Information—Information associated with a product, including but not limited to: (1) ingredient information (e.g. "contains peanuts"), (2) information related to dietary restrictions or guidelines (e.g. kosher status, Atkins® approved status, vegan status, caloric content, fat content, carbohydrate content, Weight Watchers® program points), (3) governmental messages (e.g. Surgeon General's warnings; FDA approval status), and/or (4) any other information.

Restock Date, Restock Time—The time and/or date that a vending machine is scheduled to be restocked by an operator (e.g. a route driver) of a vending machine.

User Device, Customer Device, Consumer Device—Any device owned or used by a customer, which is capable of accessing and/or displaying online and/or offline content. User devices may communicate with one or more vending machine servers or controllers, one or more vending machines, one or more peripheral devices, one or more third-party (e.g. retail store) servers, one or more user terminals, and/or other network nodes. In some embodiments, user devices may, for example, include gaming devices, personal computers, personal digital assistants (PDAs), personal music players (e.g. an MP3 player), point-of-sale terminals, point of display terminals, kiosks, conventional telephones, cellular telephones, automated teller machines (ATMs), pagers, and combinations of such devices.

As stated, various embodiments can facilitate, among other things, the communication of information regarding vending machine inventory. In an embodiment, product information is communicated to one or more customers. Based on the information and/or the customer's response thereto, a customer may or may not proceed to transact with a vending machine (e.g. by purchasing one or more items). Further, in an embodiment, a vending machine may be configured to require the customer's acknowledgement of certain product information before the customer is permitted to purchase one or more inventoried products. Other embodiments are contemplated, as discussed herein, particularly with reference to the following description.

Vending Machine Apparatus and System Architecture

Generally, a vending machine in accordance with various embodiments may comprise a device, or communicate with a device (e.g., a server, a peripheral device, and/or a peripheral device server), configured to manage sales transactions with customers by, among other things, communicating product information to customers, receiving payment from customers, controlling the pricing and/or distribution of goods, and/or controlling entitlements to services.

Referring now to FIG. 1, illustrated therein is a block diagram of an embodiment of a system. More specifically, FIG. 1 is a block diagram of a vending machine 100 that may be operable to perform one or more functions described herein.

The vending machine 100 may include a processor 105, such as one or more Intel® Pentium® or Centrino™ processors. The processor 105 (herein, "processor," "processor 105", "computer" or "control system") may include or be coupled to one or more clocks or timers (not pictured) and to one or more communication ports 165 through which the processor 105 may communicate, in accordance with some embodiments, with other devices such as one or more peripheral device servers, one or more servers, one or more peripheral devices, and/or one or more user devices. In an embodiment, a communication port 165 may comprise a modem (e.g. a cellular modem or otherwise), a wireless transmitter or transponder (e.g. an infrared transmitter/receiver, a radio transmitter/receiver).

The processor 105 is also in communication with a data storage device 110. The data storage device 110 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 105 and the storage device 110 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the vending machine 100 may comprise one or more computers (or processors 105) that are connected to a remote server computer operative to maintain databases, where the data storage device 110 is comprised of the combination of the remote server computer and the associated databases.

The data storage device 110 stores a program 115 for controlling the processor 105. The processor 105 performs instructions of the program 115, and thereby operates in accordance with various embodiments, and particularly in accordance with the methods described in detail herein. An embodiment includes a computer program 115 developed using an object oriented language that allows the modeling of complex systems with modular objects to create abstractions that are representative of real world, physical objects and their interrelationships. However, it would be understood by one of ordinary skill in the art that various embodiments as described herein can be implemented in many different ways using a wide range of programming techniques as well as general purpose hardware systems or dedicated controllers.

The program 115 may be stored in a compressed, uncompiled and/or encrypted format. The program 115 furthermore may include program elements that may be generally useful, such as an operating system, a database management system and device drivers for allowing the processor 105 to interface with computer peripheral devices. Appropriate general purpose program elements are known to those skilled in the art, and need not be described in detail herein.

Further, the program 115 is operative to execute a number of invention-specific, objects, modules and/or subroutines, as disclosed herein.

According to some embodiments of the present invention, the instructions of the program 115 may be read into a main memory of the processor 105 from another computer-readable medium, such from a ROM to a RAM. Execution of sequences of the instructions in the program 115 causes processor 105 to perform the process steps described herein. In alternative embodiments, hard-wired circuitry or integrated circuits may be used in place of, or in combination with, software instructions for implementation of the processes of various embodiments. Thus, embodiments of the present invention are not limited to any specific combination of hardware, firmware, and/or software.

In addition to the program 115, the storage device 110 is also operative to store one or more databases. As will be understood by those skilled in the art, any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types disclosed herein and likewise, object methods or behaviors can be used to implement the processes disclosed herein.

It should be noted that the term "computer-readable medium" as used herein refers to any medium that participates in providing instructions to a processor for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. Various forms of computer readable media may be involved in carrying one or more sequences of one or more instructions to a processor for execution.

Vending machine 100 may comprise payment processing mechanism(s) 150. The payment processing mechanism(s) 150 may comprise one or more mechanisms for receiving payment and dispensing change, including a coin acceptor, a bill validator, a card reader (e.g. a magnetic stripe reader) and a change dispenser.

In a manner known in the art, a magnetic stripe card reader may read data on the magnetic stripe of a credit or debit card, and it may cooperate with conventional point-of-sale credit card processing equipment to validate card-based purchases through a conventional transaction authorization network. Suitable card-based transaction processing systems and methods are available from USA Technologies, Inc., of Malvern, Pa.

The coin acceptor, bill validator and change dispenser may communicate with a currency storage apparatus (a "hopper"; not shown) and may comprise conventional devices such as models AE-2400, MC5000, TRC200 by Mars, Inc. of West Chester, Pa., or CoinCo model 9300-L.

The coin acceptor and bill validator may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein for all purposes. The change dispenser activates the return of coinage to the customer where appropriate.

In another embodiment, a vending machine in accordance with various embodiments may be configured to receive payment authorization and product selection commands through a wireless device communication network, directly or indirectly, from a customer device (e.g. a cellular telephone). In such an embodiment, a payment processing mechanism may comprise a cellular transceiver operatively connected to a processor, as described herein. Systems and methods allowing for the selection of and payment for vending machine articles through cellular telephones are provided by USA Technologies, Inc. Further, in such an embodiment, a customer cellular telephone may serve as an input/output device, as described herein.

Further details concerning vending machine payment processing mechanisms are well known in the art, and need not be described in further detail herein.

The vending machine 100 may further comprise an output device 155 and an input device 160. It should be understood that, although only a single output device 155 and a single input device 160 is illustrated in FIG. 1, any number of output devices and/or input devices may be used.

In accordance with embodiments of the presenting invention, a vending machine may include an input device for receiving input from a customer, operator, or other person. Also, a vending machine may include one or more output devices for outputting product and/or other information to a customer or operator.

Many combinations of input and output devices may be employed in accordance with embodiments of the present invention. For example, in embodiments which feature touch screens (described herein), input and output functionality may be provided by a single device.

As described, a vending machine may include more than one input device. For example, a vending machine may include an exterior input device for receiving customer input and an interior input device for receiving operator input. In some embodiments, however, the input device provides the dual functionality of receiving input data from both operators and customers.

As also described, a vending machine may comprise more than one output device. For example, a vending machine may include both an Liquid Crystal Display (LCD) screen and several Light Emitting Diodes (LEDs).

Output device 155 may comprise, for example, an LCD and/or one or more LEDs displays (e.g., several alphanumeric LEDs on the shelves of a vending machine, each LED being associated with a row of product inventory).

In one embodiment, an LED display screen may be mounted to a vending machine (e.g., attached thereto, such as via bolts or other mounting hardware). Such a mounted LED display screen and may be used to communicate messages (e.g. product information) to customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green).

Further, in some embodiments, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. raging from 9 to 24 point) on various types of paper. Additionally, such a printer may communicate with a processor (described herein) via an RS232/IEEE 12834 and/or bi-directional parallel connection. Such a printer may further comprise a 4 KB data buffer. In various embodiments, such a printer may be configured to output, for example, information concerning nutritional content, subscription accounts, transaction information, and so on.

Additionally, in some embodiments, an output device comprises an audio module, such as an audio speaker, that outputs information to customers audibly. Speakers may comprise conventional speakers or modern hypersonic speakers.

Input device 160 may comprise one or more of (1) a set of alpha-numeric keys for providing input to the vending machine, such as the Programmable Master Menu® Keypad, (2) a selector dial, (3) a set of buttons associated with a respective set of item dispensers, (4) a motion sensor, (5) a barcode reader, (6) a Dual-Tone Multi-Frequency (DTMF) receiver/decoder, (7) a wireless device (e.g. a cellular telephone or wireless Personal Digital Assistant), (8) cameras, such as digital video and/or digital still photographic cameras, (9) a microphone and/or a voice recognition module, (10) a fingerprint reader, (11) a topical facial pattern scanner/reader, (12) an iris or retinal scanner, (13) an infrared receiver, and/or (14) any other device capable of receiving a command from a user and transmitting the command to a processor.

As described, in some embodiments, a touch-sensitive screen may be employed to perform both input and output functions. Suitable, commercially available touch screens for use in accordance with various embodiments are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use in accordance with embodiments of the present invention may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art and need not be described further herein.

Vending machine 100 may further comprise one or more inventory storage and dispensing mechanism(s) 170. Product inventory storage and product dispensing functions of a vending machine configured in accordance with a snack machine embodiment of the present invention may include one or more of: (i) a drive motor, (ii) metal shelves, (iii) a product delivery system (e.g. a chute, product tray, product tray door, etc.), (iv) dual spiral (i.e. double helix) item dispensing rods, (v) convertible (i.e. extendable) shelves, and/or (vi) a refrigeration unit.

In some embodiments, a vending machine may be housed in a casing of the model 129 SnackShop manufactured by Automatic Products™. In such embodiments, 3 removable shelves may be employed, together providing for 30 product rows and an inventory capacity of between 185 to 522 commonly vended snack products.

Inventory storage and dispensing mechanism(s) 170 may comprise one or more of: (i) metal and/or plastic shelving, (ii) item dispensing actuators/motors, (iii) product delivery chutes, and/or (iv) a refrigeration unit. Further details concerning vending machine inventory storage and dispensing mechanisms are well known in the art, and need not be described in further detail herein.

Figure 2A:
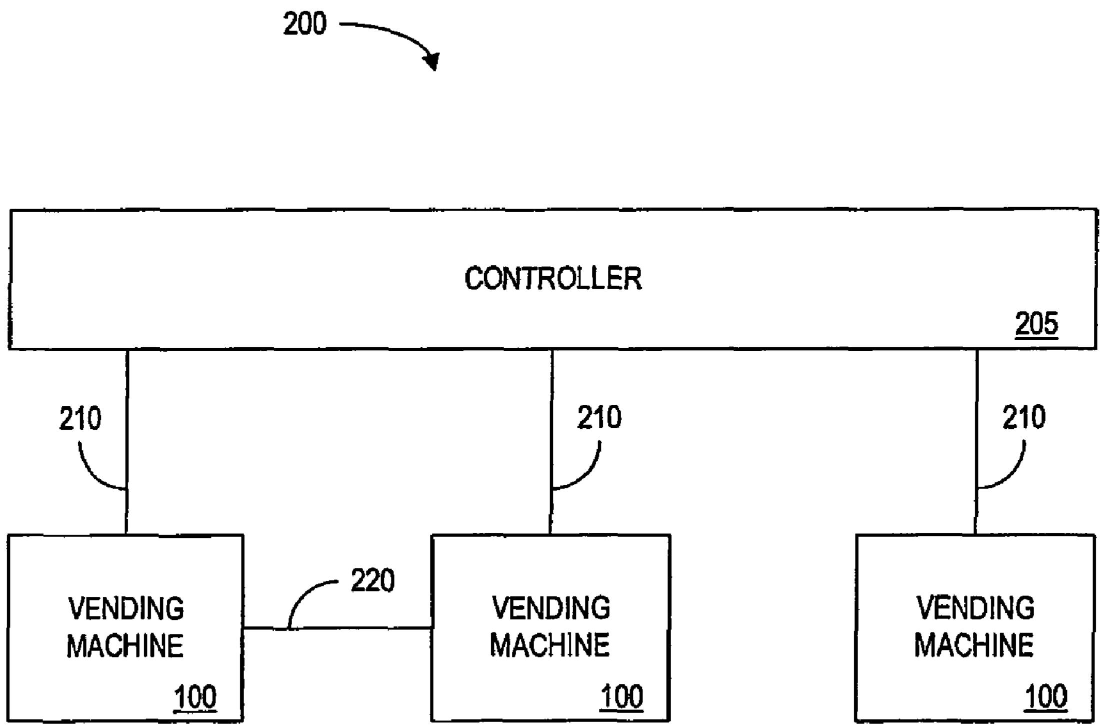
FIG. 2A is a block diagram of an embodiment of a system.

Referring now to FIG. 2A, a block diagram of a system 200 according to at least one embodiment of the present invention includes a controller 205 that is in communication, via a communications network 210, with one or more vending machines 100. The controller 205 may communicate with the vending machines 100 directly or indirectly, via a wired or wireless medium such as the Internet, LAN, WAN or Ethernet, Token Ring, or via any appropriate communications means or combination of communications means.

Each of the vending machines 100 may comprise computers, such as those based on the Intel® Pentium® or Centrino™ processor, that are adapted to communicate with the controller 205. Further, in some embodiments, a controller 205 may comprise one or more computers, such as those based on the Intel® Pentium® processor, that may or may not be located remotely to one another or remotely to one or more of the vending machines 100. Thus, in some embodiments, a controller 205 may facilitate the transmission of data between one or more vending machines 100 and one or more operator computers (not shown) so that human operators may remotely interact with vending machines and/or vending machine customers. Further still, in some embodiments, system 200 includes a user device (not shown) that enables customers to transmit data to and/or receive data from a vending machine 100 and/or controller 205.

Any number and type of vending machines 100 may be in communication with the controller 205. Communication between the vending machines 100 and the controller 205, and among the vending machines 100 (which communicate via communication network 220), may be direct or indirect, such as over the Internet through a Web site maintained by controller 205 on a remote server or over an on-line data network including commercial on-line service providers, bulletin board systems and the like. In yet other embodiments, the vending machines 100 may communicate with one another and/or controller 205 over RF, cable TV, satellite links and the like.

Some, but not all, possible communication networks that may comprise network 210 and/or network 220 or be otherwise part of system 200 include: a local area network (LAN), a wide area network (WAN), the Internet, a telephone line, a cable line, a radio channel, an optical communications line, a satellite communications link. Possible communications protocols that may be part of system 200 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the controller 205 may not be necessary and/or preferred. For example, an embodiment may be practiced on a stand-alone vending machine 100 and/or a vending machine 100 in communication only with one or more other vending machines 100. In such an embodiment, any functions described as performed by the controller 205 or data described as stored on the controller 205 may instead be performed by or stored on one or more vending machines 100.

It should be noted that, in the embodiment of FIG. 2, some of the functionality described with reference to FIG. 1 as being performed by vending machine 100 may instead or in addition be performed by controller 205. Similarly, any data described with reference to FIG. 1 as being stored in a memory of vending machine 100 may, in the embodiments of FIG. 2, be instead or in addition stored in a memory of controller 205.

Figure 2B:
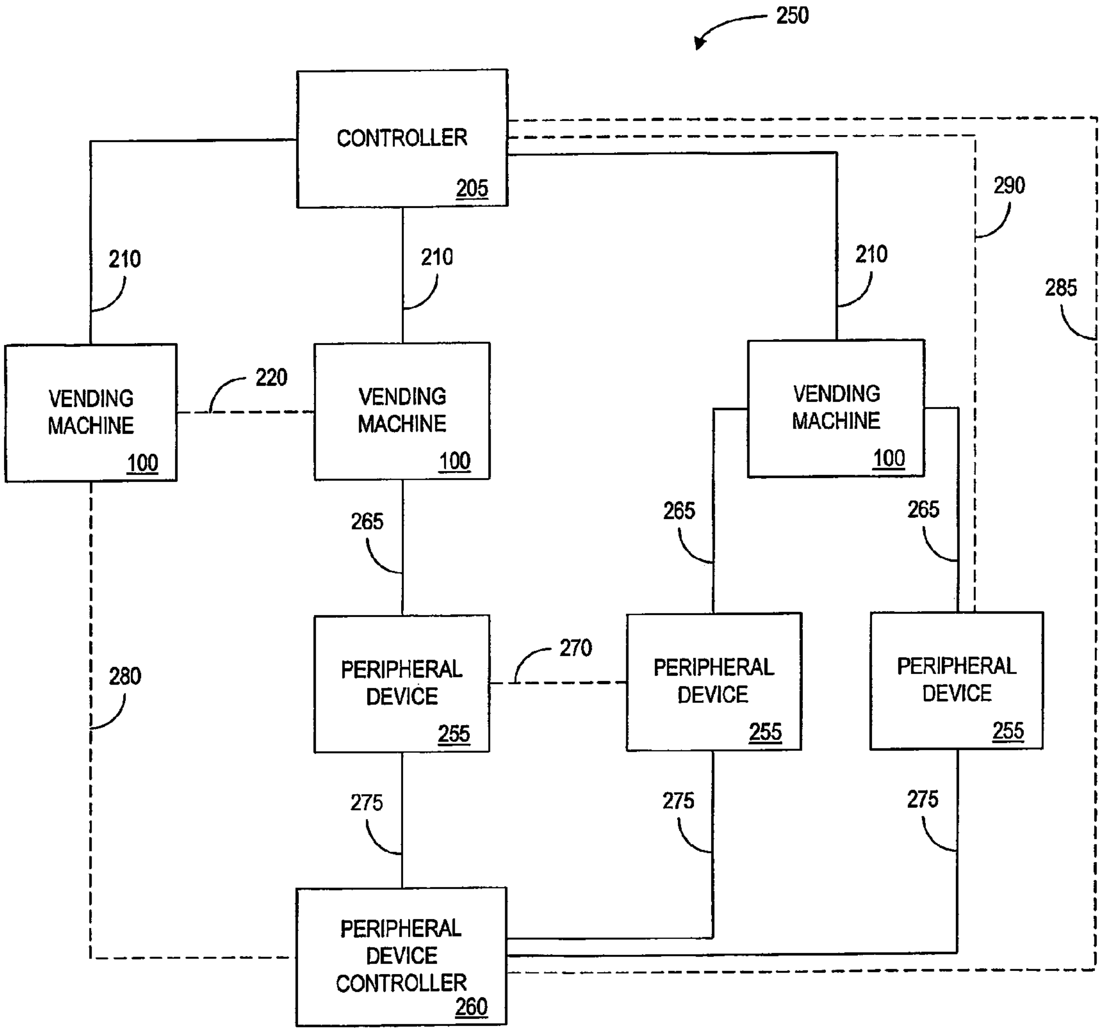
FIG. 2B is a block diagram of an embodiment of another system.

Referring now to FIG. 2B, a block diagram of another system 250 according to at least one embodiment of the present invention includes a controller 205 that is in communication, via a communications network 210, with one or more vending machines 100. A difference between system 200 (FIG. 2A) and system 250 (FIG. 2B) is that in system 250 at least one vending machine 100 is also in communication with one or more peripheral devices 255 (defined above). A peripheral device 255 may, in turn, be in communication with a peripheral device controller 260 (via communication network 275). In some embodiments, a peripheral device 255 may also or instead be in communication with controller 205 (via communication network 290), one or more vending machines 100 (via communication network 265), and/or one or more user devices (not shown). In an embodiment the peripheral device controller 260 may be in communication with one or more vending machines 100 (via communication network 280), controller 205 (via communication network 285), and/or user device (not shown).

Any of the controller 205, the vending machines 100, the peripheral devices 255 and/or the peripheral device server 260 may communicate with one another directly or indirectly, via a wired or wireless medium such as the Internet, LAN, WAN or Ethernet, Token Ring, or via any appropriate communications means or combination of communications means. For example, the controller 205 may communicate directly with one of the vending machines 100 (e.g., via a LAN) and indirectly (e.g., via a vending machines 100) with a peripheral device 255. In another example, the controller 205 may communicate with one of the vending machines 100 via a LAN and with another of the vending machines 100 via the Internet.

Any and all of the controller 205, the vending machines 100, the peripheral devices 255 and the peripheral device controller 260 may comprise computers, such as those based on the Intel® Pentium® or Centrino™ processor. Further, in an embodiment, each of the peripheral devices 255 may comprise an external or internal module associated with one or more of the vending machines 100 that is capable of communicating with one or more of the vending machines 100 and of directing the one or more vending machines 100 to perform one or more functions.

Any number of vending machines 100 may be in communication with the controller 205. Any number and type of peripheral devices 255 may be in communication with a vending machine 100, peripheral device controller 260 and controller 205.

Communication between any of the controller 205, the vending machines 100, the peripheral devices 255 and the peripheral device controller 260, among the vending machines 100 and among the peripheral devices 255 may be direct or indirect, such as over the Internet through a Web site maintained by controller 205 on a remote server or over an on-line data network including commercial on-line service providers, bulletin board systems and the like. In yet other embodiments, any and all of controller 205, the vending machines 100, the peripheral devices 255 and the peripheral device controller 260 may communicate with one another over RF, cable TV, satellite links and the like.

Some, but not all, possible communication networks that may comprise any or all of the network 210, 220, 265, 270, 275, 280, 285 and 290, or that otherwise may be part of system 250 include: a local area network (LAN), a wide area network (WAN), the Internet, a telephone line, a cable line, a radio channel, an optical communications line, a satellite communications link. Possible communications protocols that may be part of system 250 include: Ethernet (or IEEE 802.3), SAP, ATP, Bluetooth™, and TCP/IP. Communication may be encrypted to ensure privacy and prevent fraud in any of a variety of ways well known in the art.

Figure 2C:
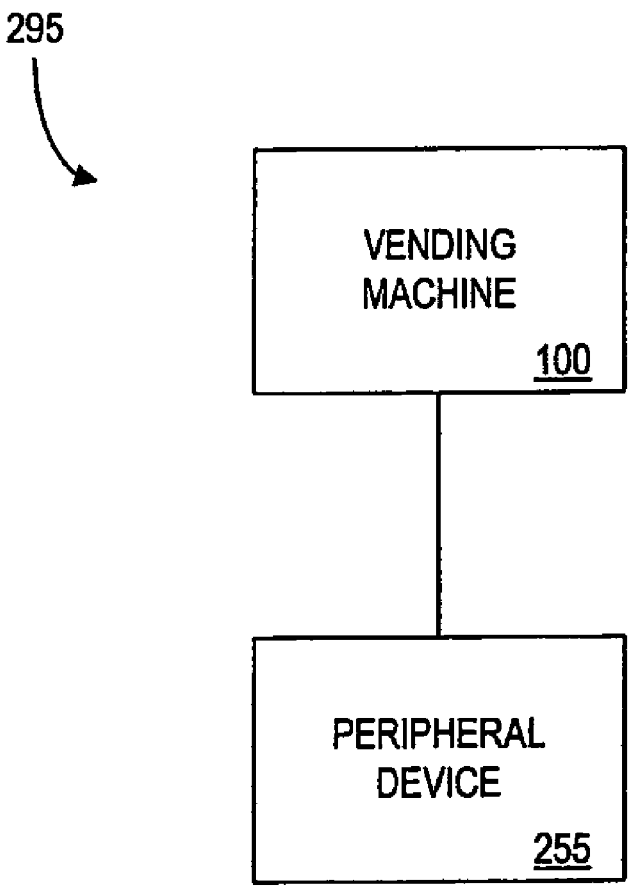
FIG. 2C is a block diagram of an embodiment of yet another system.

In an embodiment, the controller 205 may not be necessary and/or preferred. For example, an embodiment may be practiced on a stand-alone vending machine 100, one or more vending machines 100 in communication with one or more peripheral devices 255 (as illustrated in FIG. 2C), one or more vending machines 100 in communication with peripheral device controller 260, one or more peripheral devices 255 in communication with peripheral device controller 260, and/or a vending machine 100 in communication only with one or more other vending machines 100. In such embodiments, any functions described as performed by a particular device (e.g., by a vending machine 100) or data described as stored in a memory of a particular device (e.g., in a memory of a vending machine 100) may instead or in addition be performed by or stored in another of the devices described herein (e.g., a peripheral device 255).

Similarly, peripheral device controller 260 may not be desired and/or needed in some embodiments of the present invention. In embodiments that do not involve peripheral device controller 260, any or all of the functions described herein as being performed by peripheral device controller 260 may instead be performed by controller 205, one or more vending machines 100, one or more peripheral devices 255, or a combination thereof. Similarly, in embodiments that do not involve peripheral device controller 260 any data described herein as being stored in a memory of peripheral device controller 260 may instead be stored in a memory of controller 205, one or more vending machines 100, one or more peripheral devices 255, or a combination thereof.

Any or all of the vending machines 100 may, respectively, include or be in communication with a peripheral device 255. A peripheral device 255 may be a device that obtains (e.g., receives or reads) information from (and/or transmits information to) one or more vending machines 100. For example, a peripheral device 255 may be operable to obtain information about transactions being conducted at a vending machine 100, such as the initiation of a transaction, an amount of money deposited for a transaction and/or a product selected during a transaction. For example, a peripheral device 255 may monitor activities carried out by a processor of a vending machine 100.

In an embodiment, one or more such peripheral devices 255 may be in communication with a peripheral device controller 260. This allows the peripheral device controller 260 to receive information regarding a plurality of transactions conducted at a plurality of vending machines 100. The peripheral device controller 260, in turn, may be in communication with the controller 205. It should be understood that any functions described herein as performed by a peripheral device 255 may also or instead be performed by the peripheral device controller 260. Similarly, any data described herein as being stored on or accessed by a peripheral device 255 may also or instead be stored on or accessed by the peripheral device controller 260.

An example of a peripheral device that may comprise a peripheral device 255 is the e-Port™ by USA Technologies Inc. The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., promotions and information about their transaction status.

A peripheral device 255 may be operable to receive input from customers, receive payment from customers, exchange information with a remotely located server (e.g., controller 205 and/or peripheral device controller 260) and/or display messages to customers. A peripheral device 255 may be operable to instruct a vending machine 100 that appropriate payment has been received (e.g., via a credit card read by the separate device) and/or that a particular product should be dispensed by the vending machine. Further, a peripheral device 255 may be operable to instruct the vending machine to execute process steps and/or output messages (e.g. product information).

The functions described herein as being performed by a peripheral device controller 260 and/or a peripheral device 255 may, in an embodiment, be performed by the controller 205 (in lieu of or in conjunction with being performed by a peripheral device controller 260 and/or a peripheral device 255). Such functions may be performed by controller 205 in either system 200 (FIG. 2A) or system 250 (FIG. 2B).

In an embodiment, a peripheral device 255 may be useful for implementing the embodiments of the present invention into the operation of a conventional vending machine. For example, in order to avoid or minimize the necessity of modifying or replacing a program already stored in a memory of a conventional vending machine, an external or internal module that comprises a peripheral device 255 may be inserted in or associated with the vending machine. For example, a conventional vending machine may be retrofitted with a peripheral device 255 in order to implement one or more embodiments of the present invention.

A peripheral device 255 may include (i) a communications port (e.g., for communicating with one or more vending machines 100, peripheral device controller 260, another peripheral device 255, and/or controller 205); (ii) a display (e.g., for graphics and/or text associated with a promotion), (iii) another output means (e.g., a speaker, light, or motion device to communicate with a customer), (iv) a benefit providing means (e.g., a printer and paper dispensing means), and/or (v) an input means.

In an embodiment, the peripheral device 255 may direct a vending machine to perform certain functions. For example, a program stored in a memory of peripheral device 255 may cause a processor of a vending machine 100 to perform certain functions. For example, a program stored in a memory of peripheral device 255 may cause a processor of a vending machine to dispense one or more products, dispense a monetary amount, refrain from dispensing a monetary amount, refrain from outputting a product, and/or communicate with another device.

Note that, in an embodiment, a vending machine 100 and a peripheral device 255 that is associated with the vending machine 100 may not communicate with one another at all. In some embodiments, however, each may communicate with a computer or other device. For example, a vending machine 100 may communicate with controller 205 and an associated peripheral device 255 may communicate with peripheral device controller 260 and/or controller 205. For example, if both vending machine 100 and peripheral device 255 are in communication with controller 205, each may obtain information associated with the other through controller 205.

It should be noted that in either the system 200 (FIG. 2A) or the system 250 (FIG. 2B), the controller 205 and/or the peripheral device controller 260 may be accessible, directly or indirectly, via another computer (communicating, e.g., over the Internet or other network) by a customer or another entity. Accordingly, a customer or other entity (e.g., an owner of the vending machine) of the other computer could communicate with the controller 205 and/or peripheral device controller 260 via a Web browser. The other computer could, e.g., receive from the controller 205 and/or peripheral device controller 260 messages described herein as being output by the vending machine or peripheral device, and/or transmit to the controller 205 and/or peripheral device controller 260 input described herein as being provided to the vending machine. Similarly, various data described herein as received through an input device of a vending machine 100 and/or peripheral device 255 may be received through a Web browser communicating with the controller 205 and/or peripheral device controller 260, which in turn communicates with the vending machine 100. Thus, an operator of the vending machine may have remote polling and reporting capabilities (e.g. remote access to vending machine databases and diagnostics), may be able to transmit instructions and/or commands to the vending machine 100, may be able to communicate with vending machine customers of vending machine 100 (via vending machine 100's input and output devices), and the like.

Referring now to FIG. 2C, a block diagram of another system 295 according to at least one embodiment of the present invention includes a vending machine 100 that is in communication with a peripheral device 255. As described above, a prior art vending machine 100 may be retrofitted with a peripheral device 255. The peripheral device 255 may be operable to perform at least some of the methods of various embodiments and/or to direct the vending machine 100 to perform at least some of the methods of various embodiments, without requiring a controller 205 and/or a peripheral device controller 260. In an embodiment, the vending machine 100 and/or the peripheral device 255 may be accessible from a remote location via a communication port.

Figure 3:
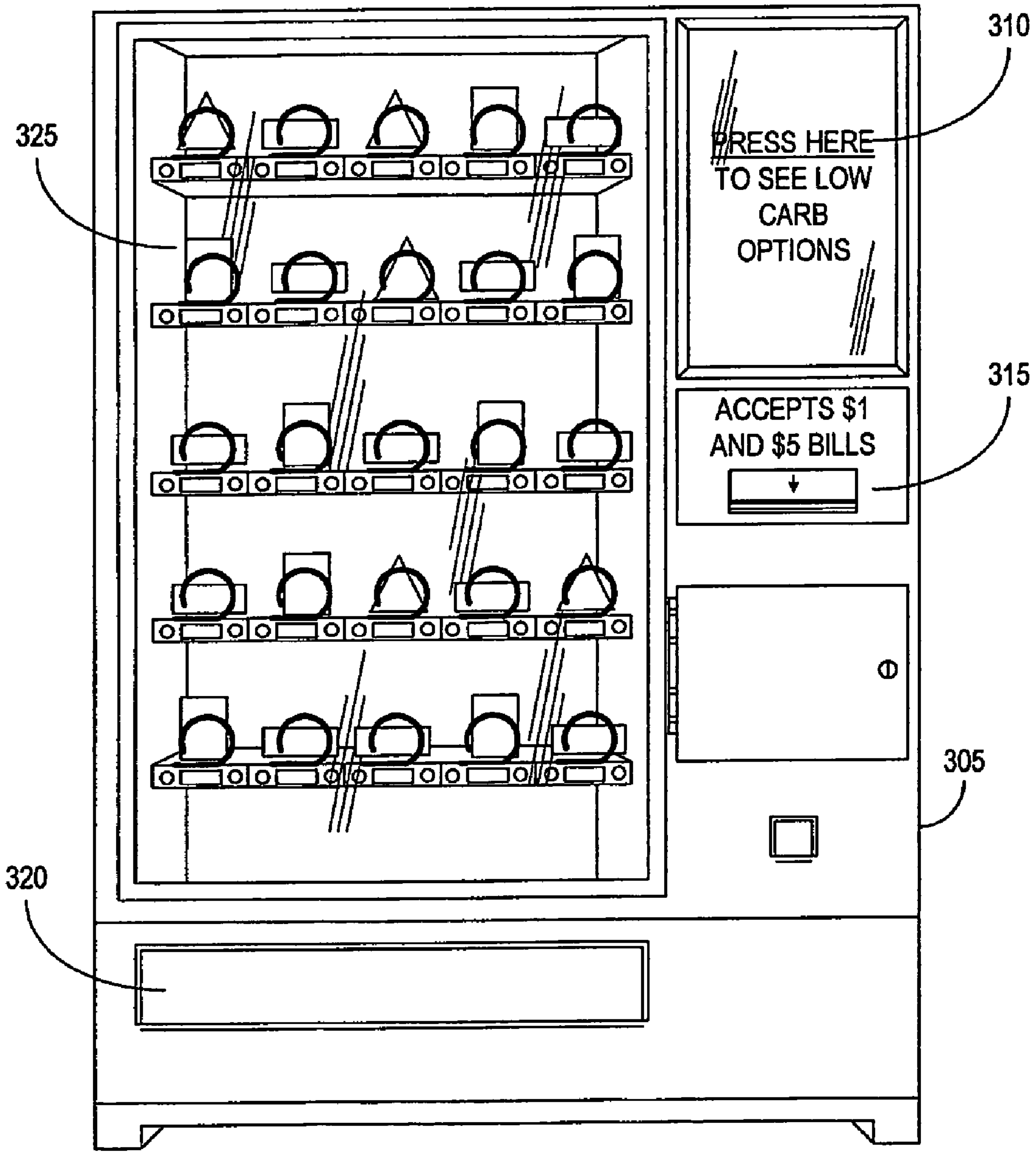
FIG. 3 is a diagram illustrating an example of the external appearance of a vending machine consistent with an embodiment.
Figure 5:
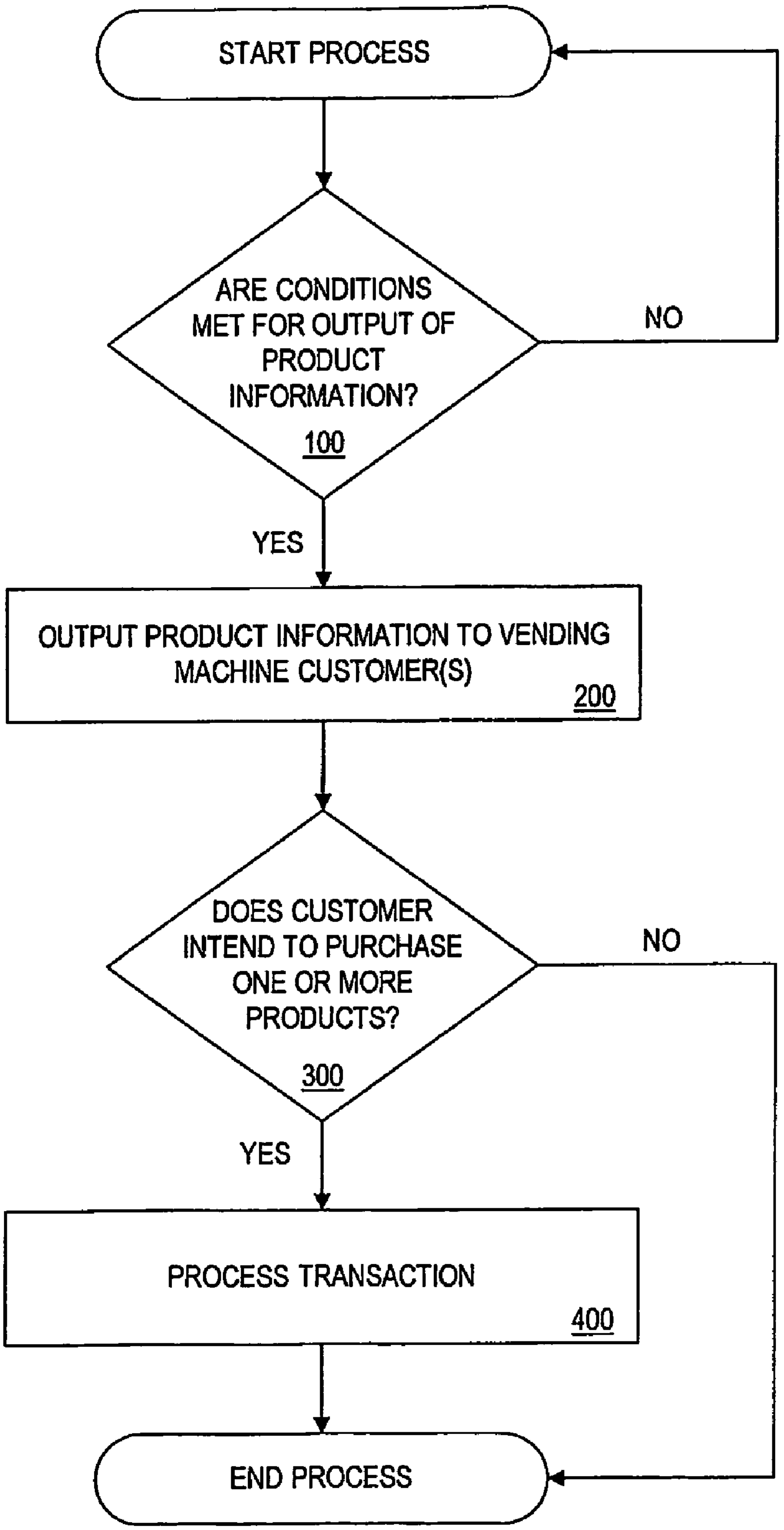
FIG. 5 is a flow diagram illustrating an exemplary process consistent with an embodiment.

Referring now to FIG. 3, a diagram of an embodiment 300 of the external appearance of an exemplary vending machine 100 is illustrated. The embodiment 300 includes (i) a cabinet 305, (ii) an input/output device 310 for receiving information from a customer and/or outputting text and/or graphical information to a customer, (iii) a payment processing mechanism 315, (iv) an inventory dispensing mechanism 320, and (iv) a product display window 325 behind which are visible the products available for sale from the vending machine and the product storage mechanism that holds the products within the vending machine.

Cabinet 305 may be constructed from, for example, any combination of (1) commercial grade (e.g., sixteen-gauge) steel (e.g., for exterior panels and internal shelving), (2) transparent materials such as glass or Plexiglas (e.g., for product display window 325), (3) rubber (e.g., for waterproofing insulation), (4) plastic, (5) aluminum, and/or (6) any suitable material.

Many commercially available machine cabinets can be modified to work in accordance with various embodiments. For example, in snack machine embodiments, a suitable machine casing may comprise the 129 SnackShop™ manufactured by Automatic Products International, Ltd.™ of Saint Paul, Minn., which stands at 72"/1829 mm wide, has a width of 38 7/8"/988 mm, and a depth of 35"/889 mm. Other suitable snack machine casings include the A La Carte™ machine from Automatic Products™, and the GPL SnackVendor™ model #159 from Crane Merchandising Systems/Crane Co.™ of Stamford, Conn.

In beverage machine embodiments, machine cabinets commercially available from Dixie Narco™, Inc. of Williston, S.C. may be employed. Beverage machine cabinets may comprise a “cooler” or “glass front” style front panel, featuring a transparent front panel (e.g. glass) enabling customers to see inventory for sale. Alternatively, beverage machine casings may comprise a “bubble front” style front panel, featuring a decorative front panel, typically used to advertise a logo of a product manufacturer commercially interested in the vending machine’s operation.

Other embodiments are contemplated as well, including combination snack and beverage vending machine embodiments, such as those available from Crain CO.™. Further details concerning the suitability of machine casing/cabinetry are well known in the art, and need not be described in further detail herein.

It should be noted that payment processing mechanism 315 may comprise any or all of the components described with reference to payment processing mechanism 150 (FIG. 1). Similarly, product dispensing mechanism 320 may comprise any or all of the components suitable for dispensing products described above with reference to inventory storage and dispensing mechanism 170 (FIG. 1).

Processes

As stated, various embodiments facilitate, among other things, the communication of information regarding vending machine inventory. In an embodiment, product information is communicated to one or more customers. Based on the information and/or the customer’s response thereto, a customer may or may not proceed to transact with a vending machine (e.g. by purchasing one or more items). Further, in an embodiment, a vending machine may be configured to require the customer’s acknowledgement of certain product information before the customer is permitted to purchase one or more inventoried products.

A process for communicating product information to vending machine customers according to one or more embodiments is provided below.

Step 100: Determine whether to output product information to vending machine customer.

In one embodiment, a process begins at Step 100 where the system (one or more of a vending machine 100, a peripheral device 255, a peripheral device controller 260, a controller 205, an operator and/or a user device) determines whether to output product information to a vending machine customer. The system may so determine to output product information if one or more conditions are satisfied.

In one embodiment, a condition for the output of product information is that a customer must indicate his or her intent (or potential intent) to purchase a product from a vending machine. Thus, in one embodiment, if a motion sensor (an input device 160) detects the presence of a customer, then the system may determine that it should output product information via an output device 155. Further, in one embodiment, the system may determine that it should output product information via output device 155 if a customer (preliminarily) selects one or more items via an input device 160 (e.g. a keypad). Further still, in one embodiment, the system may determine that it should output product information via an output device 155 if a customer deposits money into a payment processing mechanism 150, for example, by depositing bills and/or coins, swiping a magnetic stripe card, or the like.

In yet another embodiment, a customer may indicate his or her actual or potential intent to purchase a product by entering, into an input device (e.g. a touch screen) of the vending machine 100, peripheral device 255 and/or user device, an account identifier. In some account identifier embodiments, an account identifier corresponds to a financial account (e.g. a credit card account, a debit card account, a PayPal™ account, etc.). Further, according to some account identifier embodiments, a customer may enter a code previously registered or issued upon the establishment of a vending machine account, such as a prepaid “subscription” account, that enables a customer to receive several units of product over a period of time. In some embodiments, an account identifier may uniquely identify a customer (i.e., each customer is provided a unique account identifier). Vending machine subscription accounts are described at length in Applicant’s U.S. Provisional Patent Application No. 60/527,988, entitled APPARATUS, SYSTEM AND METHOD FOR ESTABLISHING MULTI-TRANSACTION RELATIONSHIPS WITH VENDING MACHINE CUSTOMERS, filed Dec. 9, 2003; U.S. Pat. No. 6,298,972, entitled METHOD AND APPARATUS FOR ESTABLISHING AND MANAGING VENDING MACHINE SUBSCRIPTIONS, issued Oct. 9, 2001; U.S. Pat. No. 6,085,888, entitled METHOD AND APPARATUS FOR ESTABLISHING AND MANAGING VENDING MACHINE SUBSCRIPTIONS, issued Jul. 11, 2000; and U.S. Pat. No. 5,988,346, entitled METHOD AND APPARATUS FOR ESTABLISHING AND MANAGING VENDING MACHINE SUBSCRIPTIONS, issued Nov. 23, 1999; the entirety of each is incorporated by reference herein.

Further, in an embodiment, a condition for the output of product information may be that one or more customers have requested the product information via the vending machine 100 (i.e. through an input device 160), via a peripheral device 255, and/or via a user device (e.g. via a cellular telephone). Thus, in one embodiment, a customer may approach a vending machine, become interested in a product after viewing the product through the product display window 325, and may wish to learn more about the product. The customer may depress keys on a keypad (an input device 160) correlating to an inventoried item (e.g. a row position identifier of a product inventory database 120), and the vending machine 100 may, in response, output corresponding product information. Or, the customer may then call a phone number posted on the vending machine 100 with his cellular telephone, and may be connected to controller 205, which may operate Interactive Voice Response (IVR) software to prompt the customer with menu options. In response to the menu prompts, the customer may depress keys on his cellular telephone, which causes the cellular telephone to emit DTMF tones to the controller 205, thereby indicating the customer's request for product information. For example, the customer may indicate a row position identifier corresponding to a shelf position of a particular product in the vending machine's inventory. In response, the controller 205 may retrieve product information and output it to the customer. For example, a customer interested in a Snickers® brand candy bar may call 1-800-VENDMOR, indicate the row position identifier corresponding to Snickers® (e.g. "A1"), and may receive ingredient content and other nutritional information (e.g. calorie content, etc.) associated with Snickers® bars.

Additionally, in an embodiment, a condition for the output of may be based on data about sales (e.g., data about sales of one or more products, demand for one or more products, profitability of one or more products, expected value of sales). For example, product information may be output if a stored product sales rule is satisfied, which may, e.g., require the presence or absence of sales-related information. For example, in one embodiment, if one or more products are selling slower than anticipated or desired (e.g. if actual product velocity is less than ideal product velocity, as indicated in a product inventory database 120), then the system may determine (e.g., in accordance with a stored product sales rule) to output certain product information in an effort to stimulate sales (i.e. low fat items may be promoted). Conversely, in some embodiments, if one or more products are selling slower than anticipated or desired, then the system may determine to stop or prevent the output of certain product information, as such information may be related to the slump in sales.

Further, in some embodiments, the system may periodically or substantially continuously test the effect on sales (and/or profits) of outputting certain product information. If the output of certain product information (e.g. fat content of inventoried products) is correlated (to a predetermined degree) with a decline in sales and/or profits, it may be deemphasized (e.g. output in a smaller font, positioned lower in a sorted list) or hidden entirely from customers. On the other hand, if the output of certain product information (e.g. vitamin content) is correlated (to a predetermined degree) with a rise in sales and/or profits, and it may be emphasized (e.g. constantly output on a touch screen, highlighted in a particular color, etc.). Thus, in some embodiments, vending machines may dynamically "adapt" to local environments by determining an appropriate amount of product information to output to customers in an effort to increase sales.

In another embodiment, a condition for the output of product information is the expected value of one or more products. Thus, in one embodiment, if a customer preliminarily selects, at Step 100, a first product, the system may determine to output product information associated with one or more other products if the expected value associated with the potential sale of the one or more other products is greater than the expected value associated with the sale of the preliminarily selected product. For example, in one embodiment, if the margin of a second product is greater than the margin of a first, preliminarily selected product, a vending machine may output product information associated with the second product. For example, if a customer preliminarily selects (at Step 100) a Coke® for $1.00, the vending machine may output (at Step 200, below) an offer enabling the customer to purchase a Diet Coke® for $1.00 because Diet Coke® exhibits greater margin potential (e.g. its retail price less its cost is greater than the difference between the retail price and cost of Coke®). Further, a condition for the output of product information associated with a second (not preliminarily requested) product may be that the second product hold some nutritional or dietary advantage over the first (preliminarily selected) product and/or over other products. Thus, if a customer preliminarily selects a Coke® (at Step 100), the vending machine may output (at Step 200, below) an offer to purchase Diet Coke® because it exhibits greater margin potential and because it has fewer calories. Accordingly, some embodiments of the present invention may be used to persuade customers into purchasing more profitable items by outputting nutritional data corresponding to such items.

Further, in another embodiment, a vending machine 100 and/or peripheral device 255 may determine to output product information by receiving a command to do so from a controller 205. Thus, in one embodiment, an operator may, through a controller 205, send a command to output product information to a vending machine 100 and/or peripheral device 255. For example, an operator may type product information into a keyboard of a personal computer, which may in turn transmit the product information to the controller 205 for ultimate transmission to the vending machine 100. The operator may send such product information in response to a request from one or more customers, who may first request the product information via a user device, vending machine 100 and/or controller 205.

Step 200: Output product information to vending machine customer.

At Step 200, product information is output to a vending machine customer. In an embodiment, product information may be output to a customer via (1) an output device 155 of a vending machine 100, (2) an output device of a peripheral device 255, and/or (3) an output device of a user device (e.g., a cellular telephone, a PDA, a personal computer).

As stated, in an embodiment, the product information to be output may be retrieved and/or received at Step 200 by a vending machine 100 and/or peripheral device 255 from a remote computer, such as controller 205. Alternatively or additionally, in an embodiment, the product information to be output may be retrieved by the system from a product inventory database 120 (FIGS. 1, 4).

As shown in FIG. 4, a product inventory database 120 may store product information that may be useful to customers and/or required by law, regulation or agreement. Prior to Step 200, such as during a restocking event at the end of a fill period, an operator (e.g., a route driver) may input the data for storage in a product inventory database 120. The operator may input the data manually into an input device 160 (e.g., a keypad) or may upload the data into an input device 160 and/or communications port 165 via a handheld device (e.g., a USB "key fob" portable memory drive) or other mobile computing device (e.g., a PDA, a personal computer, a cellular telephone).

Alternatively or additionally, product information may be downloaded to product inventory database 120 of a vending machine 100 from a controller 205. For example, in one embodiment, an operator may scan, into an internally accessible optical input device of a vending machine 100, bar coded information associated with one or more products, such as Universal Product Codes (UPCs) or Stock Keeping Unit (SKU) identifiers. In turn, the vending machine 100 may query a remote computer (e.g., controller 205) and/or database associated therewith (e.g., one maintained or hosted by controller 205) for product information corresponding to the bar coded information. The identified product information may then be downloaded to the product inventory database 120 so that, at Step 200, it may be readily accessed by a processor 105 of a vending machine 100 and output to a customer.

In yet another embodiment, during a restocking process, an operator may hold a product up to a camera (e.g. mounted to the inside of a vending machine) so that a picture may be taken of the "nutrition facts" label required by the U.S. Food & Drug Administration (FDA). The picture may be stored in a product inventory database 120, so that it may be output on a touch screen to a customer at Step 200. In yet another embodiment, an operator may upload from a device to a vending machine 100 a graphic file (e.g. a .JPG file) depicting a "nutrition facts" label.

In various embodiments, product information that is output (via an output device of a vending machine 100, a peripheral device 255, a controller 205 and/or a user device) may be presented in one or more manners or formats. Thus, in an embodiment, textual information is output. For example, information stored in a product information field of product inventory database 120 may be output via an LCD screen (e.g. a touch screen) of a vending machine or a customer's cellular telephone. Further, in an embodiment, graphical icons associated with products are output via such an output device. Further still, in an embodiment, audio content is output through a speaker of a vending machine 100, a peripheral device 255 and/or a user device (e.g. a customer's cellular telephone). Further, in one embodiment, a vending machine may print product information on a paper slip and dispense the slip to a customer. Alternatively, a vending machine may output (e.g. dispense, via an output device or an inventory dispensing mechanism 170) pre-printed paper-based materials containing product information thereon. Further, in some embodiments, product information may be communicated via a combination of static signage and one or more electronic output devices. For example, static (e.g. painted) signage may read "low fat items indicated by red flashing lights", and red LEDs located proximately to one or more (low fat) items may flash.

In some embodiments, product information may be sorted or otherwise arranged in a particular manner. For example, in one embodiment, product icons or textual descriptions may be presented on an LCD screen in a sorted manner according to one or more informational attributes, including, but not limited to caloric content, fat content, sugar content, Weight Watchers® point value, and the like. Thus, customers may, at Step 100, request (e.g., by pressing a button) to view items in descending order, for example, from the product having the lowest calorie, fat or sugar content to the product having the highest calorie, fat or sugar content. Further, in some embodiments, only a subset of a sorted list is output to a customer (e.g., only the ten lowest calorie items are presented).

In another embodiment, lights (e.g., LEDs) mounted proximately to certain products may illuminate to indicate certain product information attributes. Thus, in one embodiment, a customer may be provided with menu options on a touch screen. When selected by a customer (at Step 100), a menu option may instruct a vending machine to illuminate lights corresponding to products having certain attributes. For example, one menu option may provide a customer with the ability to "view all Atkins® approved products". Upon selection of the menu option from a touch screen, LEDs associated with each Atkins® approved product may flash so that the customer can see which items are Atkins® approved. Other menu options may permit the customer to see the products according to one or more other product information attributes (kosher status, fat free products, etc.). Further, in some embodiments, customers may select multiple menu options, so that only those products possessing all the requested attributes would be indicated by the illuminated lights (e.g. where a customer selects both Atkins® and kosher, only products which satisfy both dietary programs are indicated by illuminated lights). It should be noted that, in other embodiments, customers may select such menu options from any input device contemplated herein (e.g. keypads, microphones, etc.), and products possessing the relevant attributes may be communicated through any output device contemplated herein (LCD screens, CRT monitors, etc.). Thus, in some embodiments, a customer may request, through a cellular telephone, to hear a list (output by controller 205) of all products in a vending machine possessing or not possessing a certain informational attribute.

In some embodiments, the product information output at Step 200 may correlate to one or more items that a customer has preliminarily selected or otherwise indicated an interest in at Step 100. For example, following the exemplary data in the product inventory database 120 of FIGS. 4A and 4B, where a customer preliminarily selects a Milky Way® candy bar during Step 100 (e.g. by inputting A2 into a keypad of vending machine 100 or a user device), the system may output (at Step 200) the following text via an output device, such as an LCD screen of a vending machine 100 or a user device: "Calories=220, Fat=5 grams, Carbs=9 grams". Further, in an embodiment, a vending machine may output, at Step 200, health warnings related to a product preliminarily selected at Step 100. For example, the system may determine that, following the product information in the third record of the product inventory database 120 of FIG. 4A, a customer who preliminarily selects "Marlboro Mild" cigarettes at Step 100 should be provided, through an output device, a message which provides: "Surgeon General Warning: Smoking Causes Cancer".

Alternatively or additionally, some or all of product information that is output at Step 200 describes one or more items that a customer has not preliminarily selected or otherwise indicated an interest in at Step 100. For example, in some embodiments, the system may output data allowing a customer to make a comparison between one or more alternate products. Thus, icons and/or text describing a product preliminarily selected by a customer at Step 100 may at Step 200 be shown, on an LCD panel, along side one or more icons or text describing one or more products not selected by the customer. The system may determine product information of one or more (not selected) products by determining which products are comparable, individually or in aggregate, to a product preliminarily selected by the customer at Step 100. For example, in one embodiment, a customer may select a candy bar at Step 100, and the vending machine may show at Step 200 one or more alternate items that equate, in calories, to the candy bar (e.g. text may be output, reading "For the calories in that Milky Way® bar, you could eat two Brand X granola bars.").

It should be noted that in some embodiments, the products selected by the system for comparison (e.g. those products not preliminarily selected by the customer) may be stored in the vending machine's inventory storage apparatus 170 and/ or indicated as "in stock" in a product inventory database 120, so that the system may offer the comparable products for sale (i.e. an "alternate product offer"). Thus, the vending machine may at Step 200 promote some inventoried products as alternatives to products preliminarily requested by a customer at Step 100. Further, as stated above with respect to Step 100, in some embodiments, inventoried products may be selected for comparison and used as the basis of alternate product offers at Step 200 based on expected value considerations and/or product information attributes. Thus, in one embodiment, if a customer preliminarily selects, at Step 100, a first product, the system may, at Step 200, determine to output product information associated with one or more other inventoried products if the expected value associated with the potential sale of the one or more other products is greater than the expected value associated with the sale of the preliminarily selected product. For example, in one embodiment, if the margin of a second inventoried product is greater than the margin of a first, preliminarily selected product, a vending machine may output product information associated with the second product. Further, a condition for the output of product information associated with a second (not preliminarily requested) product may be that the second product hold some nutritional or dietary advantage over the first (preliminarily selected) product and/or over other products. Accordingly, some embodiments of the present invention may be used to persuade customers into purchasing more profitable items by outputting the nutritional data of such items.

In some alternate embodiments, the system may output product information concerning comparable products that are not in a vending machine's inventory. Thus, where a customer selects a candy bar for purchase, the system may output, for comparison, product information associated with non-inventoried products, such as fruit and vegetables. For example, text may be output on an LCD screen reading, "For the calories in that Candy bar, you could eat four apples!" Thus, the system may promote general awareness about health and nutrition, while not necessarily discouraging the purchase of preliminarily requested items. Indeed, in some embodiments, such educational information may be output at Step 400 (below), after a preliminarily requested product is dispensed (e.g. such information may be output on a touch screen or printed on a paper receipt after a preliminarily requested product is ultimately dispensed).

In yet another embodiment, a vending machine 100 may output, at Step 200, random factoids (e.g. "did you know that product X contains ingredient Y?") that may or may not correspond to preliminarily selected products.

Step 300: Determine whether customer intends to purchase one or more products.

At Step 300, the system determines whether a customer intends to purchase one or more products.

Thus, in one embodiment, where product information (e.g., a health-related warning screen; ingredient contents) is output to a customer at Step 200 in response to a customer's preliminary selection of a product at Step 100, the system may determine, at Step 300, whether or not a customer has consented to purchasing the preliminarily requested product after receiving and contemplating the product information. In an embodiment, a customer may affirmatively indicate his or her acceptance in one or more ways, including but not limited to, (1) depressing a button on a keypad of a vending machine 100 or a user device (e.g., a cell phone) and/or (2) speaking into a microphone of a vending machine 100 and/or of a user device (e.g., customer says "I accept" or "yes" after being shown U.S. Surgeon General warnings or after being shown caloric content of food items). Further still, in an embodiment, a customer may be required to confirm his or her acknowledgement of or acquiescence to product information by pressing keypad buttons or touch screen icons in a certain order, answering test questions correctly (e.g., questions about product information previously output at Step 200), or the like.

Further, in one embodiment, a customer may indicate his or her acceptance by receiving a code from a controller 205 (e.g. through a user device, such as a cellular telephone) and entering the code into an input device 160 of a vending machine 100. Thus, in at least one embodiment, a customer may be required to call a controller 205 (at Step 100) and listen to product information (at Step 200) before receiving an "access code" which permits the customer to purchase a product from a vending machine.

Alternatively or additionally, a customer may indicate his or her acceptance by not actively providing an indication of acceptance within a predetermined, threshold period of time (i.e. the customer's silence constitutes acceptance). For example, if a customer does not press a button of a vending machine 100 or of a user device within 30 seconds, it may be assumed that the customer intends to purchase a product even after being provided associated product information.

Further, in an embodiment, a customer may select, at Step 300, a product not preliminarily selected at Step 100. Thus, in one embodiment, a customer may accept, at Step 300, an alternate product offer presented to the customer at Step 200. For example, a customer may receive, at Step 200, product information of one or more alternate products not preliminarily selected by the customer at Step 100. After reviewing the product information, the customer may indicate, at Step 300, his or her desire to purchase one or more products not preliminarily selected at Step 100.

Further still, in an embodiment, the system may determine at Step 300 that a customer does not wish to purchase one or more products. For example, a customer may affirmatively indicate to the system (e.g. via an input device 160) that he does not wish to purchase either a product preliminarily selected at Step 100 or one or more alternate products presented at Step 200. Alternatively, the system may determine at Step 300 that the customer does not wish to purchase one or more products if the customer does not provide any response whatsoever within a threshold period of time. If the customer does not wish to purchase one or more products, the process may end.

Step 400: If customer intends to purchase one or more products, process transaction.

If it is determined at Step 300 that the customer intends to purchase one or more products, the system proceeds at Step 400 to process a transaction.

In an embodiment, the step of processing a transaction comprises dispensing one or more of (1) product(s) preliminarily selected by the customer at Step 100, and/or (2) product(s) presented to the customer in an alternate product offer at Step 200. Generally, the system may dispense a product to a customer by activating an inventory dispensing mechanism 170 corresponding to the relevant product. Apparatus and methods for dispensing vending machine products are well known in the art and need not be discussed in further detail herein.

Further, in an embodiment, the step of processing a transaction comprises processing a payment. Thus, in some embodiments, the system may process a cash or credit-based payment (e.g. through a payment processing mechanism 150), or may debit a prepaid unit ("subscription") account, as described herein. Vending machine payment processing is well known in the art and need not be discussed in further detail herein.

Further, in an embodiment, the system may at Step 400 record the customer's consent and/or acknowledgement of product information (output at Step 200) in a transaction database 125 (FIG. 1). In one such embodiment, the system may receive, through a microphone, a voice input from a customer (e.g. a customer may state "I accept") and may record the voice input at Step 400. Further, the system may record a picture of a customer taken with a camera mounted to a vending machine 100. Further still, the system may record a code (or indication thereof) received by a vending machine 100 from a customer at Step 300 (i.e. in an embodiment where a customer calls a controller 205, listens to product information, and receives an "access code" after acknowledging the product information). Such records may be stored in conjunction with a transaction identifier (e.g. generated by the processor 105) and/or a payment identifier (e.g. a prepaid unit account identifier, a credit card number, etc.). Accordingly, any such recordation may be subsequently retrieved by an operator, governmental investigator, or customer, to prove that a customer was presented with relevant product information prior to the consummation of a transaction.

EXAMPLES

Following are examples of various embodiments of the invention. The examples are not in any way limiting on the scope of the present disclosure. The examples are provided to illustrate the breadth and scope of the disclosed embodiments.

1. Bob approaches a soda vending machine and views various inventoried snacks through the machine's product display window. Concerned about veering from his diet, he presses a button on the vending machine's touch screen reading "see nutrition information". After pressing the button, Bob is prompted by the vending machine to enter a row position identifier corresponding to a product. As Bob is curious about the nutritional content of Coke®, he selects enters "C1" using buttons on the touch screen. In response, the vending machine outputs (on the touch screen) the FDA label corresponding to "Coke". After determining that the product conforms to his diet, Bob proceeds to purchase the item.
2. Sue approaches a snack vending machine and views various inventoried snacks through the machine's product display window. Concerned about veering from her Weight Watchers® diet, she presses a button on the vending machine's touch screen reading "see Weight Watchers® points". After pressing the button, Sue is shown (on the touch screen), a list of all the inventoried products, sorted by Weight Watchers® point values (from lowest to highest). Sue selects the lowest point value product.
3. Jack approaches a cigarette vending machine, intending to purchase a pack of Newport® cigarettes. A sign on the machine reads, "Want smokes? Call 1-800-555-1212 to get an authorization code". Jack uses his cell phone to call the phone number, and a computer running IVR software outputs a pre-recorded message to Jack's cell phone, the message providing, "Warning: Cigarettes may cause lung cancer. If you still wish to buy cigarettes, press 1 now." Jack presses 1 on his cell phone's keypad, and the computer outputs an authorization code, which Jack enters into the vending machine's touch screen. Via the Internet, the vending machine confirms with the computer that the authorization code is valid, and proceeds to process Jack's transaction. The computer uses Automatic Number Identification (ANI) technology to determine Jack's phone number, and records, in conjunction with his phone number, an indication of his consent in a new record of a transaction database.
4. Joan approaches a snack vending machine and proceeds to purchase a Snickers® bar. Upon determining that Nature's Valley® granola bars have a higher profit margin than Snickers® bars and have fewer calories and grams of fat than Snickers® bars, the vending machine outputs an alternate product offer on a touch screen reading, "With fewer calories and grams of fat than Snickers®, why not try a Nature's Valley® granola bar instead?" Persuaded, Joan presses a button on the touch screen reading "buy a Nature's Valley® granola bar", and the vending machine proceeds to process a transaction for the sale of a Nature's Valley® granola bar.
5. John, a high school student, approaches a vending machine in the lobby of his school. He deposits $1.00 into the vending machine and proceeds to select a bag of M&M's® candies. The vending machine dispenses the M&M's®, and also outputs a message reading, "Did you know that apples are fat free and high in fiber?" John received his M&M's, and learned a nutrition fact in the process.

Additional Embodiments

In some embodiments, where the system outputs nutrition information, the system may determine the total content of fat, calories, carbohydrates, or the like in a package by determining how many units of each metric are in each serving of the product and multiplying the number by the number of servings in the product. Such information can be obtained from an FDA label on a product and/or may be stored in a product inventory database. Thus, in some embodiments, the system can provide customers with totaled information for an entire package of a product (e.g. the total number of calories in a bag of chips, rather than the number of calories per serving). Such an embodiment may serve to make nutrition information clearer and/or less misleading.

In some embodiments, where the system outputs a list of information items (e.g. a list of inventoried products and a corresponding list of calorie totals), only a subset of a list may be shown on a screen at a single point in time. Accordingly, in some embodiments, a customer may instruct a screen to scroll through additional list items. Further, in some embodiments, product manufacturers may pay vending machine operators for more favorable (e.g. higher) positioning in such a list of products.

In some embodiments, the system may output nutritional information on a graph. For example, caloric content might be graphed along an X axis, while carbohydrate content is shown along the Y axis (or vice versa). Such a graph may accordingly show a customer if a particular product is high in calories but low in carbohydrates, or the like. Further, in some embodiments, multiple items may be plotted on a single graph, so that customers can compare nutritional attributes of several products.

In some embodiments, a customer may input desired (or undesired) ingredients or nutritional content (e.g. maximum number of calories desired; allergic sensitivities) and a vending machine may output, in response, a list of conforming products from which the customer may choose one or more for purchase.

In an embodiment featuring prepaid unit ("subscription") accounts (as referenced herein), such accounts may allow customers a balance of diet-related units, in addition to units of inventory. For example, a customer may purchase a prepaid unit account (e.g. such as Applicants' SnackPass™), which enables a customer to redeem several units of product over a period of time. In some embodiments, the prepaid unit account may correlate to a "budget" of diet-related units including, but not limited to, calories, fat and Weight Watchers® points. Thus, in some embodiments, a customer may be shown, during a transaction, a balance of remaining prepaid units of inventory, and a balance of remaining diet-related units. Such embodiments would enable a customer to prepay for several units of product, and to obtain help from a vending machine in staying within certain dietary goals or guidelines. For example, a customer may purchase a "DietPass", which permits the customer to receive discounts on snack items from a vending machine (e.g. 11 units for $5), but also guides the customer's selection of such items so that the customer does not exceed a total of 1000 calories per week. Accordingly, during a transaction in which a customer attempts to redeem a prepaid unit of product, a customer's options may be limited so that the customer stays within a caloric budget (e.g. lights may flash next to items that are still within the customer's caloric budget).

Further, in some embodiments, a customer may register product information preferences when establishing a prepaid unit account (e.g. by selecting an option to "always show me the product that is lowest in fat), so that when the customer enters an account identifier, product information may be output in accordance with stored preferences.

Further still, in some embodiments, a customer may, through a user device, access a web site to (i) establish or renew a prepaid unit account, and/or (ii) establish or adjust product information preferences.

We claim:

1. A method, comprising:

storing, by a vending machine, data correlating a each of a plurality of product sold by the vending machine to one or more of a plurality of nutritional attribute groups;

displaying, via an output device of a vending machine, a plurality of customer-selectable menu options, each menu option corresponding to a specific one of the plurality of nutritional attribute groups;

receiving, by the vending machine and from a customer of the vending machine, an indication of a selection of one of the plurality of menu options, thereby defining a customer selection of a corresponding one of the plurality of nutritional attribute groups;

communicating, by the vending machine and to the customer, information identifying which of the plurality of products sold by the vending machine correspond to the customer-selected one of the plurality of nutritional attribute groups;

determining by the vending machine, whether the customer desires to purchase a unit of one of the identified corresponding products;

dispensing, in the case that it is determined that the customer desires to purchase the unit of the one of the identified corresponding products, the unit of the one of the identified corresponding products from the vending machine.

2. The method of claim 1, wherein:

the customer-selected one of the plurality of nutritional attribute groups is defined by one or more of: (i) a fat content of a product relative to other products; (ii) a sugar content of the product relative to other products; (iii) a caloric content of a product relative to other products; (iv) a Weight Watchers® point value of the product (v) a lack of fat content of the product (vi) a conformance of the product to a specific diet regimen; and (vii) an ingredient of the product.

3. The method of claim 1, in which the communicating comprises:

displaying, by the vending machine and to the customer, a sorted list of the identified products that correspond to the customer-selected one of the plurality of nutritional attribute groups.

4. The method of claim 1, in which the communicating comprises:

commanding a light that is proximate to at least one of the identified corresponding products in the vending machine to: (i) illuminate; or (ii) flash.

5. An apparatus, comprising:

a processor and a memory storing a program which, when executed by the processor, directs the processor to perform the method of claim 1.

6. A computer-readable memory device storing instructions that, when executed by a processor, direct the processor to perform the method of claim 1.

* * * * *